(12) United States Patent
Zanella

(10) Patent No.: US 9,850,981 B2
(45) Date of Patent: Dec. 26, 2017

(54) MECHANICAL REDUCER DEVICE WITH HIGH REDUCTION RATIO

(71) Applicant: Primo Zanella, Fidenza (IT)

(72) Inventor: Primo Zanella, Fidenza (IT)

(*) Notice: Subject to any disclaimer, the term of this patent is extended or adjusted under 35 U.S.C. 154(b) by 217 days.

(21) Appl. No.: 14/399,973

(22) PCT Filed: May 10, 2013

(86) PCT No.: PCT/IB2013/053795
§ 371 (c)(1),
(2) Date: Nov. 10, 2014

(87) PCT Pub. No.: WO2013/168132
PCT Pub. Date: Nov. 14, 2013

(65) Prior Publication Data
US 2015/0148184 A1 May 28, 2015

(30) Foreign Application Priority Data
May 11, 2012 (IT) .............................. PR2012A0029

(51) Int. Cl.
*F16H 1/28* (2006.01)
*F16H 1/32* (2006.01)
*F16H 1/46* (2006.01)

(52) U.S. Cl.
CPC ............. *F16H 1/2854* (2013.01); *F16H 1/28* (2013.01); *F16H 1/321* (2013.01); *F16H 1/46* (2013.01); *F16H 2001/2881* (2013.01)

(58) Field of Classification Search
CPC ........... F16H 1/30; F16H 1/321; F16H 1/2854
(Continued)

(56) References Cited

U.S. PATENT DOCUMENTS 873,681 A * 12/1907 Pendleton ............... F16H 3/663
475/273
1,392,567 A * 10/1921 Horine ................... F16H 1/2854
475/332

(Continued)

FOREIGN PATENT DOCUMENTS

FR           55 636          9/1952

OTHER PUBLICATIONS

International Search Report dated Oct. 14, 2013, corresponding to PCT/IB2013/053795.

*Primary Examiner* — Stacey Fluhart
(74) *Attorney, Agent, or Firm* — Young & Thompson

(57) ABSTRACT

A mechanical reducer with high reduction ratio, includes a box-like case (C), an input shaft (I), rotatably supported by the case and adapted to be brought into rotation at an input angular speed (VI), and an output shaft (U), mechanically connected to the input shaft via reduction members (1) and adapted to provide an output angular speed (VU) that is reduced with respect to the input speed. In the reducer device (300), the reduction members include: an input movable drive group (310), conducted in rotation by the input shaft and including one first secondary toothed wheel (Z2) and one second secondary toothed wheel (Z3) integral therewith; a reference fixed drive group (320), including a reference toothed wheel (Z1) which engages the first secondary toothed wheel; an output movable drive group (330), mechanically connected to the output shaft and including an output toothed wheel (Z4) which engages the second secondary wheel.

2 Claims, 9 Drawing Sheets

(58) Field of Classification Search
USPC .................................................. 475/242, 336
See application file for complete search history.

(56) References Cited

U.S. PATENT DOCUMENTS

| | | | | | |
|---|---|---|---|---|---|
| 2,267,562 | A | * | 12/1941 | Higgins | B60K 17/36 |
| | | | | | 180/24 |
| 4,520,692 | A | * | 6/1985 | Cummins | F16H 48/06 |
| | | | | | 475/245 |
| 4,671,136 | A | * | 6/1987 | Katayama | B60K 17/3462 |
| | | | | | 180/249 |
| 4,744,268 | A | * | 5/1988 | Kurywczak | F16H 57/082 |
| | | | | | 475/331 |
| 4,788,891 | A | * | 12/1988 | Katori | F16H 35/02 |
| | | | | | 475/17 |
| 2011/0195815 | A1 | | 8/2011 | Bagdonis | |
| 2013/0203553 | A1 | * | 8/2013 | Fong | F16H 1/2863 |
| | | | | | 475/336 |

* cited by examiner

MECHANICAL REDUCER DEVICE WITH HIGH REDUCTION RATIO

BACKGROUND OF THE INVENTION

Field of the Invention

The present invention is inserted the technical field relative to mechanical reducers, i.e. to the devices intended to transmit mechanical momentum, by varying the modulus and angular speed thereof.

In particular, the invention regards a mechanical reducer device with gears with high reduction ratio.

Description of the Related Art

Different types of mechanical speed reducers are known, which differ for the configuration and complexity of the couplings between the various members composing them. In general, though, they possess an input and an output, from which a rotation speed lower than that at the input can be drawn as well as a greater mechanical modulus of momentum.

The reducer of simplest type is that composed by a ring gear that engages in a corresponding pinion, with smaller diameter than the ring. Both are fit on corresponding drive shafts; the shaft of the pinion, or input shaft, provides the mechanical momentum to be reduced in speed and increased in modulus, whereas the ring gear shaft, or output shaft, provides the mechanical momentum with increased modulus and reduced rotation speed. The speed reduction ratio is given by the ratio between the number of gears of the pinion and that of the ring gear, and hence substantially by the ratio between the respective circumferences.

A reducer of this type is per se very simple, but in practice it does not supply a high reduction ratio, since the dimensions of the ring gear increase considerably, as does therefore the overall bulk of the reducer.

Another known type of reducer is the so-called worm reducer, in which a toothed wheel is coupled to a shaft whose surface has a high-angle helical thread, whose teeth are called worm teeth. The coupling between the worm and the helical cylindrical ring gear has the object of transferring motion and mechanical momentum between two axes that are orthogonal to each other and do not intersect. The worm or "conductor" is usually the member that transmits the motion to the helical ring gear. The reduction ratio depends on the ratio between the diameters and on the pitch of the worm, i.e. the thread angle.

The disadvantage of such reducer, in addition to that of only operating with axes orthogonal to each other, is that of having low efficiency, and in any case becoming increasingly bulky as the transmission ratio increases.

A further type of simple reducer is that of the epicycloidal reducers in which, for example, a system of one or more gears called "satellite gears", mounted on a member defined "planet gear", rotates around a central pinion defined "sun gear". All of this is placed inside an internally toothed wheel called "ring gear". The rotation axis of the planet and sun gears coincide. During use, one of the three elements is maintained fixed, while the other two constitute the input and output of the mechanical momentum to be transmitted.

The transmission ratio is given by the number of teeth, but also by which elements constitute the input and output. In general, epicycloidal reducers are not adapted to supply a high transmission ratio, but are considered optimal for transmitting a high mechanical momentum.

Other types of reducers allow obtaining more advantageous reduction ratios, but always at the cost of considerable bulk and/or considerable structural complexity.

BRIEF SUMMARY OF THE INVENTION

One object of the invention is to propose a mechanical reducer of rotation speed capable of obtaining high reduction ratios, maintaining a limited bulk.

A further object of the invention is to propose a mechanical reducer with high reduction ratio with a simple and reliable structure, and with limited production costs.

Another object of the invention is to propose a mechanical reducer with high reduction ratio in which such ratio is easily modifiable, without however compromising the structure, the simplicity and reliability of the reducer itself.

The abovementioned objects are all achieved by the mechanical reducer device with high reduction ratio, object of the present finding, which is characterized as provided for in the below-reported claims.

BRIEF DESCRIPTION OF THE DRAWINGS

These and other characteristics will be clearer from the following description of several embodiments that are illustrated, as a mere non-limiting example, in the enclosed set of drawing tables where.

DETAILED DESCRIPTION OF THE PREFERRED EMBODIMENTS

The mechanical reducer device with high reduction ratio described here is of the type comprising a box-like case C, provided on an input wall C1 thereof with an input opening 2 and on an output wall C2 thereof with an output opening 3, an input shaft I, entering said case C through said input opening 2, rotatably supported by the same and adapted to be brought into rotation at an input angular speed VI, and an output shaft U, exiting outward from said case C through said output opening 3, rotatably supported by the same and mechanically connected to the abovementioned input shaft I by means of reduction members 301,401,501,601,701 and adapted to provide an output angular speed VU that is reduced with respect to said input speed VI.

Figure 1:
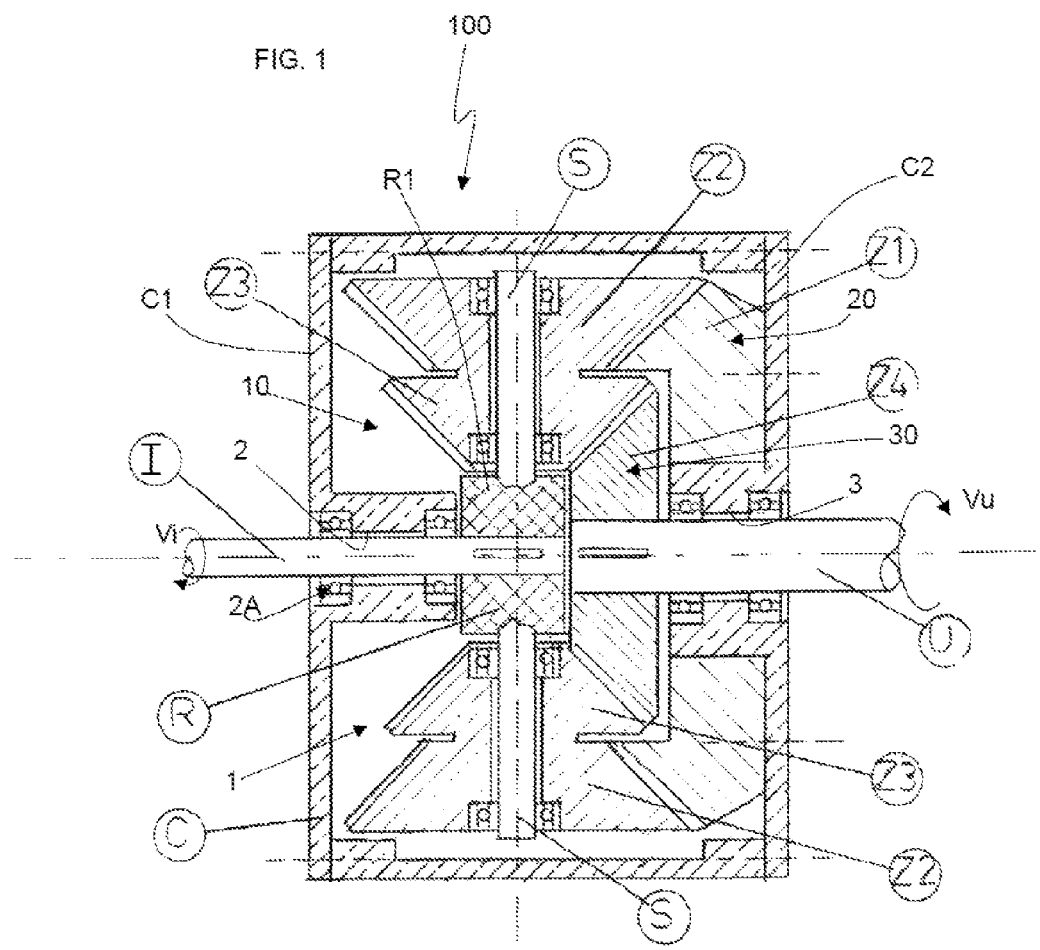
FIGS. 1-9 illustrate nine embodiment variants of the present reducer, in accordance with corresponding side section views of the device.

With particular reference to FIG. 1, a mechanical reducer device obtained according to a first non-limiting embodiment of the invention is indicated in its entirety with the reference number 100. In particular, the reducer 100 comprises a box-like case C, provided on an input side wall C1 thereof with an input opening 2, and on an output side wall C2, opposite the wall C1, with an output opening 3.

An input shaft I enters into the case C from the input opening 2; one distal end of such input shaft I is connected to rotary motion generator members, not illustrated since they are not relevant with regard to the invention, adapted to bring the same input shaft I to a specific rotation speed VI. The input shaft I is rotatably supported in the aforesaid input opening 2 by means of suitable bearings or groups of bearings 2a, in order to allow the rotation thereof with minimum friction.

An output shaft U exits outward from the case C from the output opening 3; such output shaft U is rotatably supported by means of further bearings or groups of bearings 3a, adapted to rotate with rotation speed VU substantially less than the speed VI.

For such purpose, between the input shaft I and the output shaft U, speed reduction members 1 are interposed, inside the case C, adapted to transmit the rotation motion between the two shafts and to reduce the rotation speed thereof.

More specifically, the speed reduction members 1 comprise an input movable drive group 10, mechanically connected to the input shaft I and conducted in rotation by the same, a reference fixed drive group 20, mechanically connected to the movable drive group 10, and an output movable drive group 30, also mechanically connected to the input drive group 10 and to the output shaft U, according to that which will be illustrated in more detail below.

The input drive group 10 comprises a rotor R, with cylindrical shape, fit at the end to the input shaft I and on the axis with the same.

A pair of secondary shafts S is fixed at opposite ends of the lateral face R1 of the rotor R, such shafts identical to each other and extended from the rotor R perpendicular to the axis thereof and to the axis of the input shaft I.

Each of the secondary shafts S supports, by means of suitable groups of bearings, one first secondary toothed wheel Z2 and one second secondary toothed wheel Z3, idle on their axes and integral with each other. The latter is mounted in the part of the secondary shaft S that is more internal with respect to the rotor R, whereas the first secondary wheel Z2 is mounted more external with respect to the same.

The two secondary wheels Z2,Z3 have conical toothing, and respectively possess $Z2n$ and $Z3n$ teeth which can be present with the same or different number as a function of the reduction ratio that one intends to obtain, as will be described hereinbelow.

In particular, in the illustrated embodiment, the secondary wheels Z2,Z3 are obtained in a single body, only for reasons of structural simplicity.

The reference drive group 20 comprises a reference toothed wheel Z1, mounted fixed on the internal face of the output wall C2, coaxial with respect to the output shaft U. Also the reference wheel Z1 has conical toothing, with teeth $Z1n$ that engage on both the abovementioned first secondary toothed wheels Z2.

The output movable drive group 30 comprises an output toothed wheel Z4, fit at the end of the output shaft U, coaxial with the latter and internally with respect to the reference toothed wheel Z1, such that its teeth $Z4n$ engage in both of the abovementioned second secondary toothed wheels Z3.

In this manner, the rotation motion of the input shaft I is transmitted to the output shaft U, through the first Z2 and second Z3 secondary toothed wheels, and the output toothed wheel Z4, with a reduction ratio that in substance depends on the ratios between the number of teeth of the different toothed wheels. In particular, the reduction ratio RR for a mechanism such as that described is given by the following formula:

$$RR = \frac{Z4n}{(Z1n - Z4n) + [(Z3n - Z2n)*(Z1n/Z2n)]}$$

The functioning of the reducer device 100 according to the first embodiment of the invention will be described below with reference to several numeric examples, in the first of which $Z1n=40$, $Z2n=20$, $Z3n=20$ e $Z4n=39$.

By applying a rotation on the input shaft I, the rotor R rotates with the same angular speed, as do therefore the two secondary shafts S and the two pairs of secondary toothed wheels Z2,Z3. The first secondary toothed wheel Z2, by rolling on the reference toothed wheel Z1, completes two revolutions on itself for every rotation of the rotor R, as does therefore the second secondary toothed wheel Z3, integral with the first, which in turn rolls on the output toothed wheel Z4.

Two complete revolutions of the second secondary wheel Z3 correspond to 40 teeth, since $Z3n=20$ teeth. Since the output toothed wheel Z4 possesses only 39 teeth, for each rotation of the input shaft I itself, and hence also the output shaft U, such teeth are obliged to rotate an angle corresponding to a single tooth. In this case, therefore, the output shaft U completes a complete revolution every 39 revolutions of the input shaft I, and the reduction ratio RR is therefore equal to 39.

In a second embodiment, in which $Z1n=39$, $Z2n=20$, $Z3n=20$, $Z4n=38$, from the application of the abovementioned considerations, one obtains that the reduction ratio RR is equal to 19. It was therefore sufficient to decrease the value of $Z4n$ by 1 in order to halve the reduction ratio.

It is in any case obtained that, if the secondary wheels Z2,Z3 possess the same number of teeth, the maximum reduction ratio is obtained when the number of teeth of the output toothed wheel $Z4n$ and of the reference toothed wheel $Z1n$ differ by one tooth.

A more substantial variation of the reduction ratio RR can be obtained by varying the number of teeth of the first Z2 and second Z3 secondary wheels.

A further embodiment, in which $Z1n=40$, $Z2n=30$, $Z3n=29$ and $Z4n=39$, by applying the abovementioned calculation formula, provides a reduction ratio RR=117.

By suitably varying the number of teeth of the various toothed wheels, it is possible to obtain a high number of values of the reduction ratio RR, without however modifying the structure or the size of the reducer device 100. In order to better exploit the characteristics of the latter, it is also advisable that the number of teeth $Z1n$ of the reference wheel Z1 and $Z4n$ of the output wheel Z4 differs by at least one tooth. For the same reason, it is preferable that the number of teeth of the secondary wheels $Z2n$ and $Z3n$ differs by one tooth.

According to a further embodiment, aimed to emphasize the versatility of the reducer device 100 in obtaining exceptionally high reduction ratios RR with small modifications of the characteristics of the device 100 itself, one assumes having toothed wheels Z1,Z2,Z3,Z4 that respectively possess the following number of teeth: $Z1n=40$; $Z2n=39$; $Z3n=38$; $Z4n=39$.

In this case, the application of the simple formula illustrated above provides a reduction ratio RR=1521, much higher than those of the preceding embodiments, without having to significantly modify the size of the toothed wheels or of the entire reducer device 100.

Figure 2:
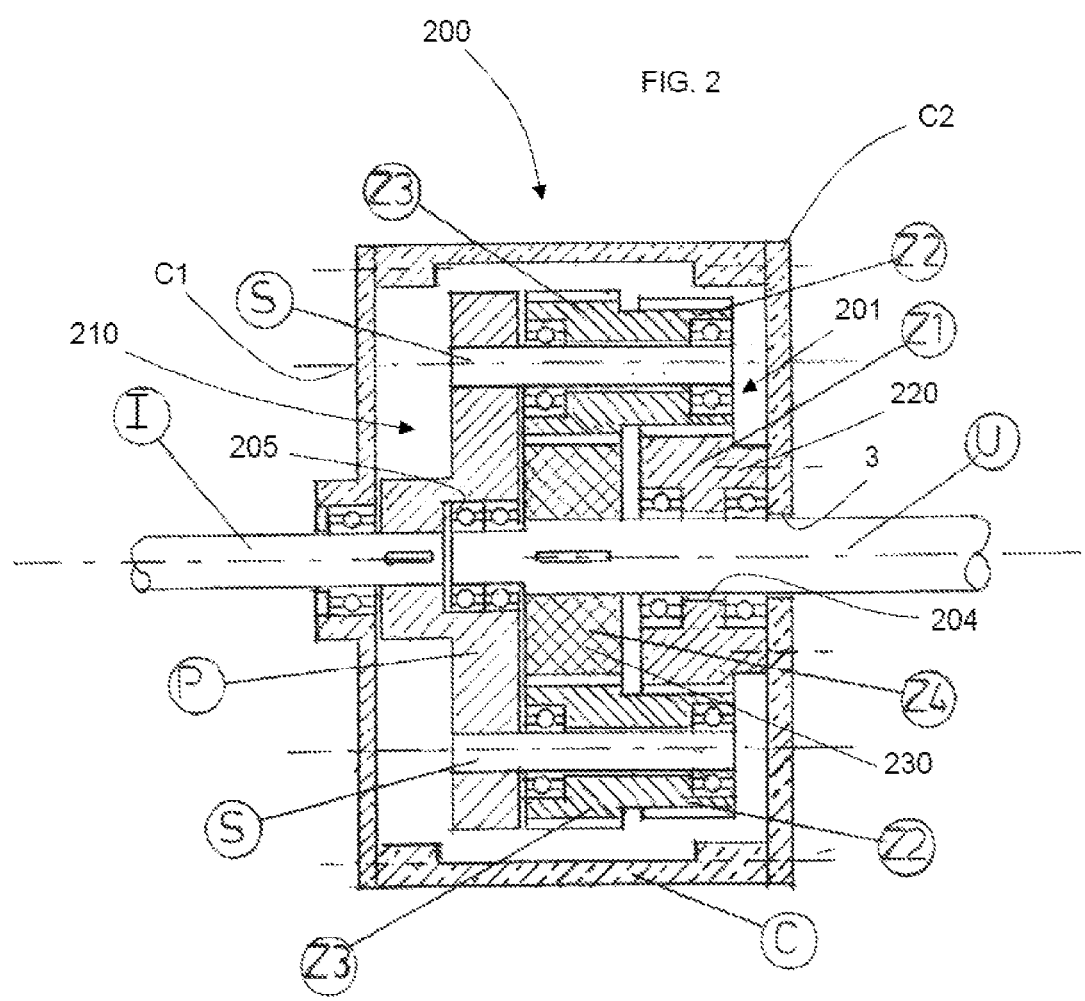

In a second embodiment of the invention, illustrated in FIG. 2, a reducer device 200 provides for speed reduction members 201 comprising an input movable drive group 210, mechanically connected to the input shaft I and conducted in rotation by the same, a reference fixed drive group 220, mechanically connected to the movable drive group 210, and an output movable drive group 230, also mechanically connected to the input drive group 210 and also connected to the output shaft U.

The input drive group 210 comprises a rotor R shaped as a disc, with an enlargement at the center to which the head of the input shaft I is fixed. The axis of the rotor R coincides with the axis of the input shaft I.

From the face of the rotor R directed towards the interior of the case C, in proximity to the lateral edge of the rotor R itself, a pair of secondary shafts S exits outward, which are extended parallel with respect to the axis thereof and to that of the input shaft I.

Each of the secondary shafts S idly supports, on the axis thereof, one first secondary wheel Z2 and one second secondary wheel Z3, respectively in a more internal position and a more external position with respect to the rotor R. The latter are cylindrical toothed wheels, integral with each other and, in the illustrated embodiment, are by way of example obtained in a single body.

The reference drive group 220 provides that the reference toothed wheel Z1 is also a cylindrical wheel, is fixed to the internal face of the output wall C2 of the case C coaxial with the axis of the output opening 3, and engages with the first secondary toothed wheel Z2.

The reference wheel Z1 possesses an axial hole 204, through which the output shaft U passes and inside of which a group of bearings is provided adapted to rotatably support the same shaft.

The output drive group 230 provides that the output toothed wheel Z4 is also a cylindrical toothed wheel, mounted in the terminal portion of the output shaft U, internally with respect to the reference wheel Z1 and engaged with the second secondary wheel Z3.

The output shaft is in turn rotatably supported, not only by the aforesaid reference wheel Z1 but also at an axial cavity 205 obtained in the internal part of the rotor R.

Figure 3:
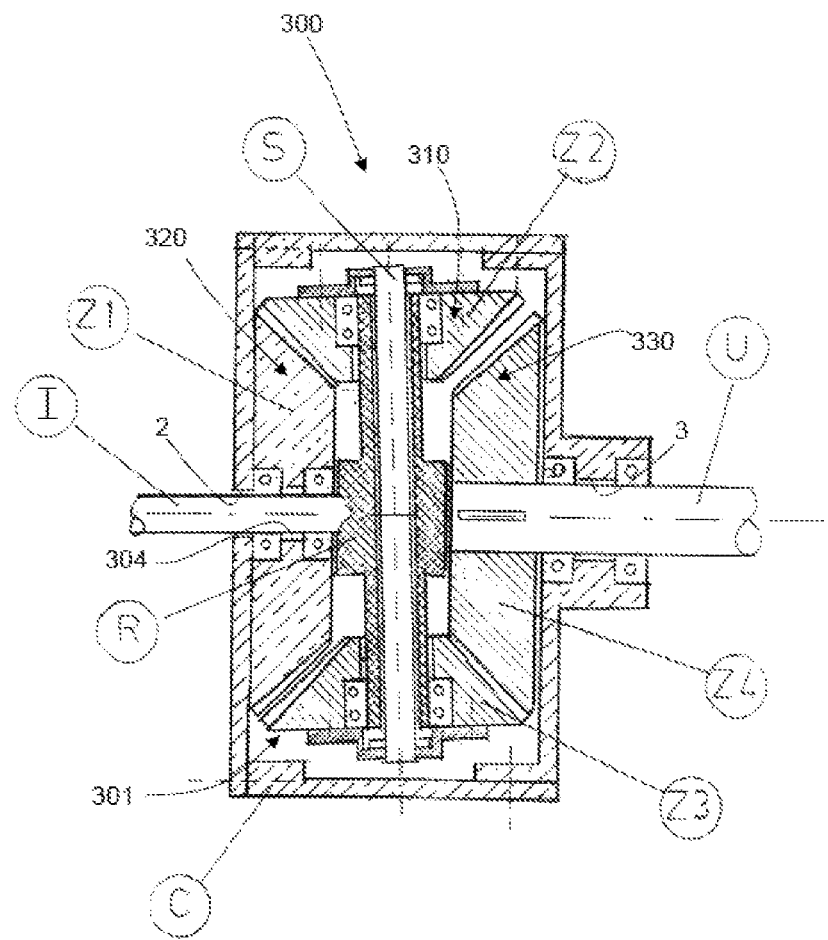

In a third embodiment of the invention, illustrated in FIG. 3, a reducer device 300 provides for speed reduction members 301 comprising an input movable drive group 310, mechanically connected to the input shaft I and conducted in rotation by the same, a reference fixed drive group 320, mechanically connected the movable drive group 310, and an output movable drive group 330, also mechanically connected to the input drive group 310 and also connected to the output shaft U.

In particular, the input movable drive group 310 comprises a rotor R having tubular conformation, mounted at the end of the input shaft I with axis slightly tilted with respect to the perpendicular to the axis of the same shaft. A secondary shaft S is mounted coaxial and without engagement inside the rotor R, and is extended for the entire length thereof, slightly exiting outward from the ends thereof.

One first secondary toothed wheel Z2 and one second secondary toothed wheel Z3, of the type with conical toothing, are mounted opposite each other at the opposite ends of the rotor S, idly supported by the same by means of suitable groups of bearings.

The first Z2 and second Z3 secondary wheels are also fixed to the opposite ends of the secondary shaft S, so as to be integral with each other.

The reference group 320 provides a reference toothed wheel Z1, also with conical toothing, fixed to the internal face of the input wall C1 of the case C, coaxial with respect to the input shaft I, and it rotatably supports such shaft at an axial hole 304 thereof by means of suitable bearings.

Due to the abovementioned tilted positioning of the rotor R, the reference toothed wheel Z1 only engages with the first secondary wheel Z2 and not with the second Z3.

The output drive group 330 provides for an output toothed wheel Z4, with conical toothing, mounted at the end of the output shaft U, in a position coaxial with the input shaft I and facing the reference toothed wheel Z1. Due to the tilted positioning of the rotor R, the output toothed wheel Z4 engages with the second secondary wheel Z3 and not with the first Z2.

Figure 4:
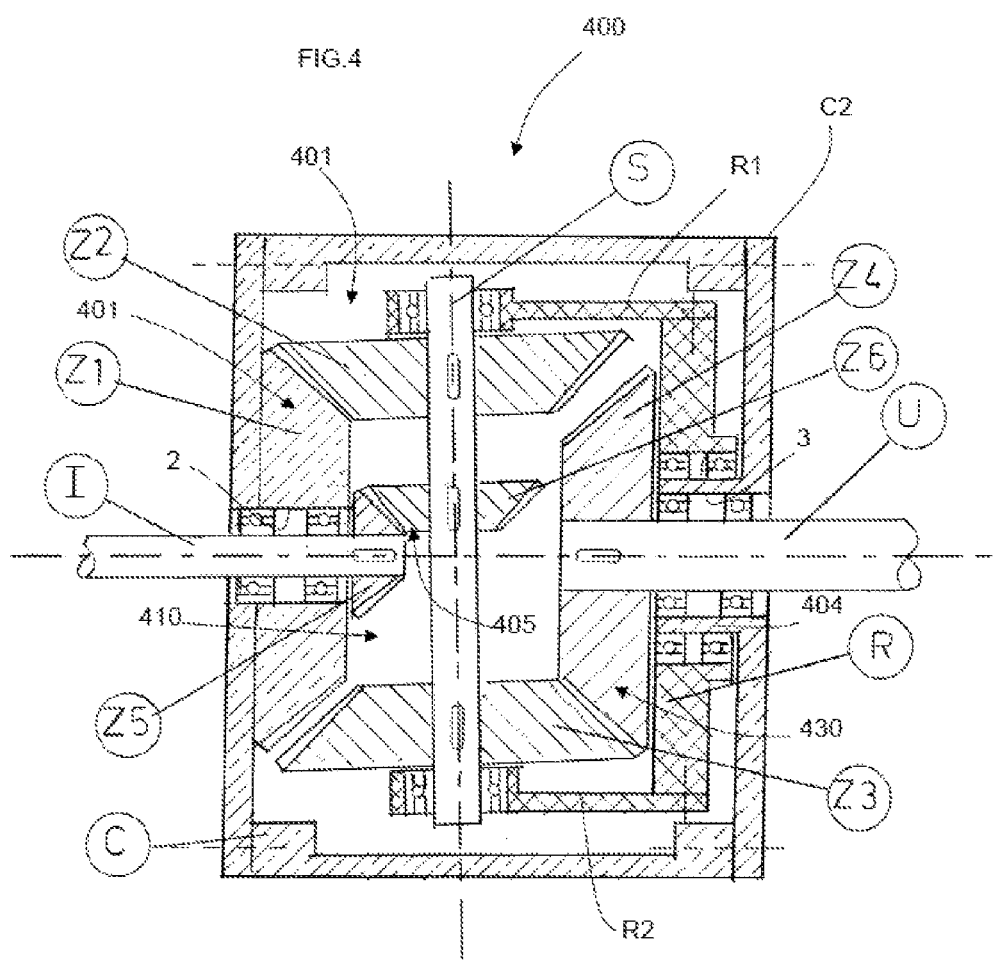

A fourth embodiment of a speed reducer device 400 according to the invention is illustrated in FIG. 4.

According to such embodiment, in the movable drive group 410 the rotor R is obtained in fork form, and is idly mounted on a sleeve 404 that is extended from the internal face of the output wall C2 of the case C.

A pair of arms R1,R2 of the rotor R is extended parallel to the input shaft I, towards the interior of the case C. The secondary shaft S is mounted, freely rotatable, between the opposite ends of the arms R1,R2, with axis slightly tilted with respect to the perpendicular of the input shaft I.

The latter is mechanically coupled to the secondary shaft S by means of a spur gear 405, adapted to transmit the rotation motion to the latter, with a first speed reduction depending on the ratio between the pinion and ring gear teeth in the aforesaid spur gear 405.

As described above, also in this case a reference toothed wheel Z1 is provided fixed to the input wall C1 of the case C, and an output toothed wheel 404 is provided mounted at the end of the output shaft U and facing the aforesaid reference wheel Z1.

Since the coupling between the reference Z1, secondary Z2,Z3 and output Z4 toothed wheels is always identical, the functioning of the reducer device 400 remains substantially unchanged with respect to that described in the first embodiment of the invention. The overall reduction ratio, obtainable as a function of the different combinations of the number of teeth of the same toothed wheels, must however also take under consideration the reduction ratio given by the spur gear 405. In practice, the overall reduction ratio is in this case obtained by multiplying that given by the above formula times the reduction ratio of the spur gear 405.

Figure 5:
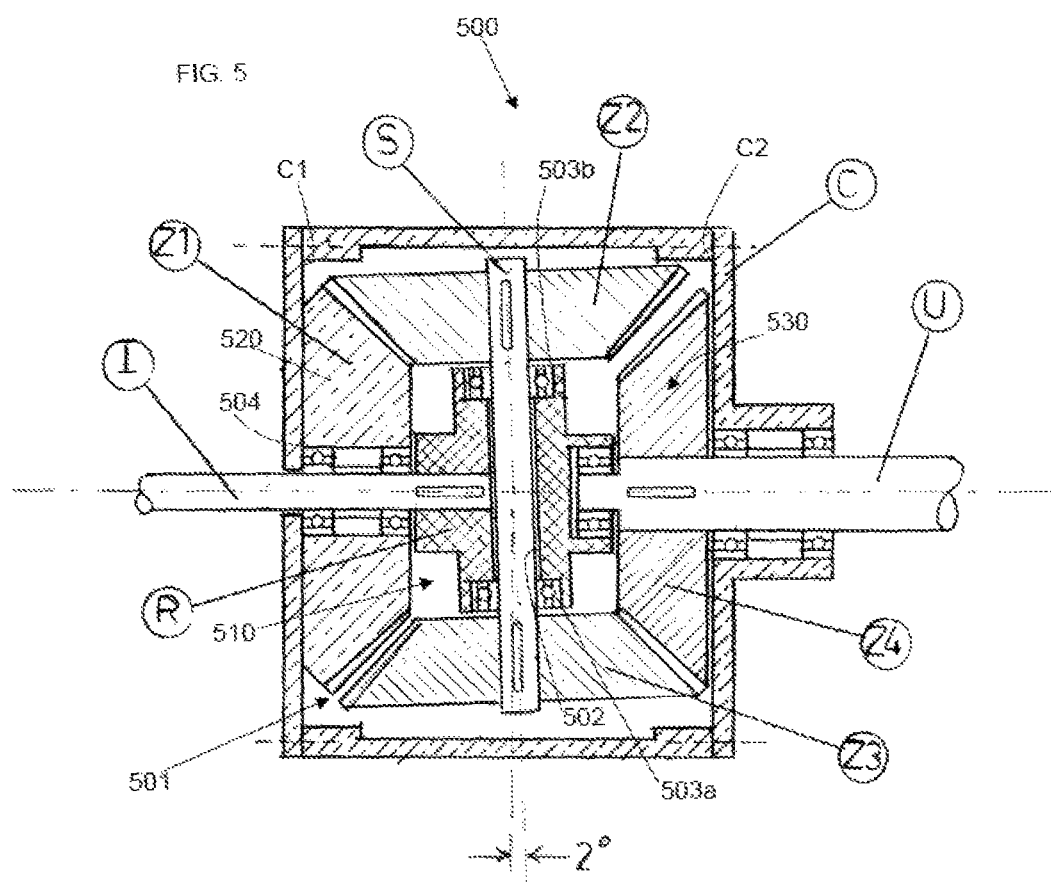

A fifth embodiment of the reducer 500 according to the invention is illustrated in FIG. 5.

According to such fifth embodiment, speed reduction members 501 are provided that comprise: an input movable drive group 510, mechanically connected to the input shaft I and conducted in rotation by the same; a reference fixed drive group 520, mechanically connected to the movable drive group 510; an output movable drive group 530, also mechanically connected to the input drive group 510 and also connected to the output shaft U.

In particular, the input movable drive group 510 comprises a rotor R constituted by a block with cylindrical symmetry mounted at the end of the input shaft I. At the end opposite the rotor R, the head of the output shaft U is idly mounted, which is on the axis with the input shaft I.

In the rotor R, a through hole 502 is obtained whose axis is arranged transverse and slightly tilted with respect to the perpendicular to the axis of the same input shaft I. A secondary shaft S is idly mounted inside the through hole 502, by means of bearings 503a,503b provided at the opposite ends of the same, and the shaft is extended for the entire length of the through hole, exiting outward from the ends thereof.

One first secondary toothed wheel Z2 and one second secondary toothed wheel Z3, of the type with conical toothing, are mounted opposite each other at the opposite ends of the secondary shaft S, integral therewith.

The reference group 520 provides a reference toothed wheel Z1, also with conical toothing, fixed to the internal face of the input wall C1 of the case C, coaxial with respect to the input shaft I, and it rotatably supports such shaft at an axial hole 504 thereof by means of suitable bearings.

Due to the abovementioned tilted positioning of the rotor R, the reference toothed wheel Z1 only engages with the first secondary wheel Z2 and not with the second Z3.

The output drive group 530 provides for an output toothed wheel Z4, with conical toothing, mounted at the end of the output shaft U, in a position coaxial with the input shaft I and facing the reference toothed wheel Z1. Due to the tilted positioning of the rotor R, the output toothed wheel Z4 engages with the second secondary wheel Z3 and not with the first Z2.

Figure 6:
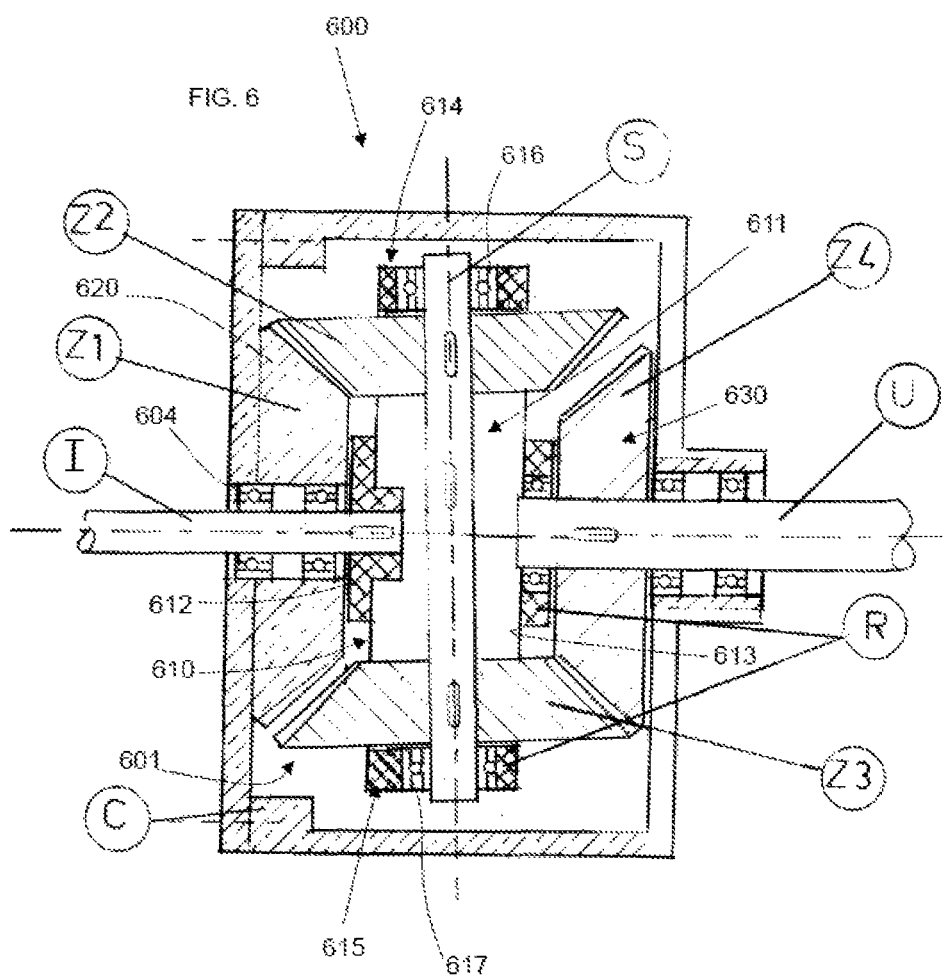

A sixth embodiment of the reducer 600 according to the invention is illustrated in FIG. 6.

According to such sixth embodiment, in a manner entirely similar to that described for the preceding embodiment, speed reduction members 601 are provided that comprise: an input movable drive group 610, mechanically connected to the input shaft I and conducted in rotation by the same; a reference fixed drive group 620, mechanically connected to the and it rotatably supports such shaft group 610; an output movable drive group 630, also mechanically connected to the input drive group 610 and also connected to the output shaft U.

In particular, the input movable drive group 610 comprises a rotor R constituted by a frame 611, having substantially elongated plate form, arranged inside the case C transversely with respect to the axis of the input shaft I. From the greater sides of the frame 611, two input 612 and output 613 supports are perpendicularly extended, provided with holes on which the ends of the input shaft I and the output shaft U are respectively fixed in a manner so to be aligned with the common rotation axis.

From the shorter sides of the frame 611, two further first 614 and second 615 supports are extended, perpendicular and in the same direction as the two abovementioned supports; first 614 and second 615 supports are provided with through holes 616,617, aligned with each other in transverse direction with respect to the axis of the input I and output U shafts, with a slight tilt with respect to the perpendicular to the aforesaid input I and output U shaft axes. A secondary shaft S is extended between the two further supports 614,615, with the ends thereof idly mounted in the aforesaid through holes 616,617, by means of a pair of bearings.

One first secondary toothed wheel Z2 and one second secondary toothed wheel Z3, of the type with conical toothing, are mounted opposite each other at the opposite ends of the secondary shaft S, immediately inside the aforesaid further supports 614,615 and integral therewith.

The reference group 620 provides a reference toothed wheel Z1, also with conical toothing, fixed to the internal face of the input wall C1 of the case C, coaxial with respect to the input shaft I, and it rotatably supports such shaft at an axial hole 604 thereof by means of suitable bearings.

Due to the abovementioned tilted positioning of the rotor R, the reference toothed wheel Z1 only engages with the first secondary wheel Z2 and not with the second Z3.

The output drive group 630 provides for an output toothed wheel Z4, with conical toothing, mounted at the end of the output shaft U, in a position coaxial with the input shaft I and facing the reference toothed wheel Z1. Due to the tilted positioning of the rotor R, the output toothed wheel Z4 engages with the second secondary wheel Z3 and not with the first Z2.

Since the coupling between the different toothed wheels is always identical, the functioning of the reducer device 500,600 according to the above-described fifth and sixth embodiments remains unchanged with respect to that described in the first embodiment of the invention, just as the reduction ratio remains the same, obtainable as a function of the different combinations of the number of teeth of the same toothed wheels.

Figure 7:
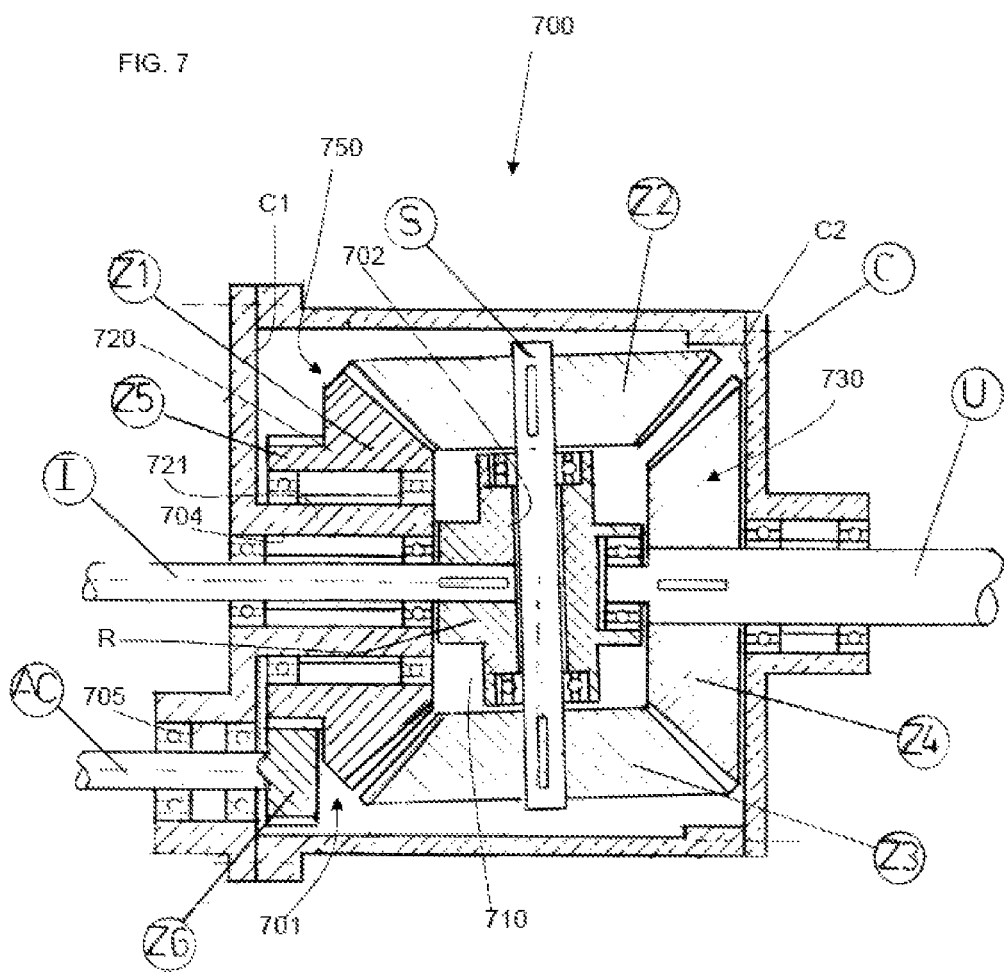

A seventh embodiment of the present reducer, with reference number 700, is illustrated in FIG. 7.

The structure and the mechanical couplings of the reducer 700 according to the aforesaid seventh embodiment assume the characteristics of the reducer 500 of the above-described fifth embodiment of the invention.

Therefore, with reference to the abovementioned FIG. 5, speed reduction members 701 are provided that comprise: an input movable drive group 710, mechanically connected to the input shaft I and conducted in rotation by the same; a reference fixed drive group 720, mechanically connected to the movable drive group 710; an output movable drive group 730, also mechanically connected to the input drive group 710 and also connected to the output shaft U.

In particular, the input movable drive group 710 comprises a rotor R constituted by a block with cylindrical symmetry mounted at the end of the input shaft I. At the opposite end of the rotor R, the head of the output shaft U is idly mounted, which is on the axis with the input shaft I.

A through hole 702 is obtained in the rotor R; the axis of such hole is arranged transverse and slightly tilted with respect to the perpendicular to the axis of the same input shaft I. A secondary shaft S is idly mounted inside the through hole 702, by means of bearings provided at the opposite ends of the same, and such shaft is extended for the entire length of the hole, exiting outward from the ends.

One first secondary toothed wheel Z2 and one second secondary toothed wheel Z3, of the type with conical toothing, are mounted opposite each other at the opposite ends of the secondary shaft S, integral therewith.

The output drive group 730 provides for an output toothed wheel Z4, with conical toothing, mounted at the end of the output shaft U, in a position coaxial with the input shaft I and facing the reference toothed wheel Z1. Due to the tilted positioning of the rotor R, the output toothed wheel Z4 engages with the second secondary wheel Z3 and not with the first Z2.

The reducer 700 differs in particular from the above-described reducer 500 according to the fifth embodiment due to the fact that the reference group 720 provides for a reference toothed wheel Z1, also with conical toothing, idly mounted on the axis thereof in a protrusion 721 of the internal face of the input wall C1 of the case C, by means of suitable bearings. The protrusion 721 has an input axial hole 704, and rotatably supports the input shaft I, also by means of suitable bearings.

Due to the abovementioned tilted positioning of the rotor R, the reference toothed wheel Z1 only engages with the first secondary wheel Z2 and not with the second Z3.

The reducer 700 also provides for a control group 750, which comprises a cylindrical toothed control wheel Z5, provided with a given number of teeth NC1 and fixed to the rear part of the reference toothed wheel Z1. The toothed control wheel Z5 hence comes to be situated between the reference wheel Z1 and the input wall C1 of the case C. In particular, in the illustrated embodiment, the toothed control wheel Z5 is made in a single body with the reference toothed wheel Z1.

In the lower part of the case C, a control hole 705 is obtained through which a control shaft AC passes, idly supported by means of bearings and parallel to the input shaft I. At the end of the control shaft AC, a control pinion Z6 is mounted, provided with a number of teeth NC2, which engages in the abovementioned toothed control wheel Z5. The control shaft AC is actuatable in rotation in an independent manner with respect to the input shaft I, by suitable non-illustrated control members.

The functioning of the reducer 700, as with the law that regulates the reduction ratio between the output shaft U and the input shaft I, are identical to that of the reducer according to the other embodiments described above if the control shaft AC is maintained still/stopped. In this manner, indeed, the reference toothed wheel Z1 is maintained fixed.

If a rotation is set to the control shaft AC, the reduction ratio obtained by the reducer 700 depends on the rotation speed of the aforesaid control shaft AC, on the ratio NC1/NC2 between the number of teeth of the toothed control wheel Z5 and those of the control pinion Z6, as well as on the rotation direction of the control shaft AC itself.

As a function of the rotation of the latter, the reduction ratio can be progressively decreased or increased, until the reducer is substantially deactivated, annulling the rotation speed of the output shaft.

It should be underlined that the above-described control group 750 for the aforesaid seventh embodiment of the reducer according to the invention can be advantageously applied also to the reducer obtained according to all the other embodiments described here, without having to make non-readily deducible structural modifications to the same.

The reduction members 301,401,501,601,701 comprise, arranged inside said case C:
an input movable drive group 310,410,510,610,710, mechanically connected to said input shaft I, conducted in rotation by the same,
a rotor R mounted at the end of said input shaft I, at least one secondary shaft S conducted in rotation by said input shaft I and arranged with orientation slightly tilted with respect to the perpendicular to the latter,
at least one first secondary toothed wheel Z2 and one second secondary toothed wheel Z3, constrained to said secondary shaft S; a constrained reference drive group 320,420,520,620,720, comprising a reference toothed wheel Z1 which engages said first secondary toothed wheel Z2; an output movable drive group 330,430,530, 630,730, mechanically connected to said output shaft U and comprising an output toothed wheel Z4 which engages the abovementioned second secondary wheel Z3.

Figure 8:
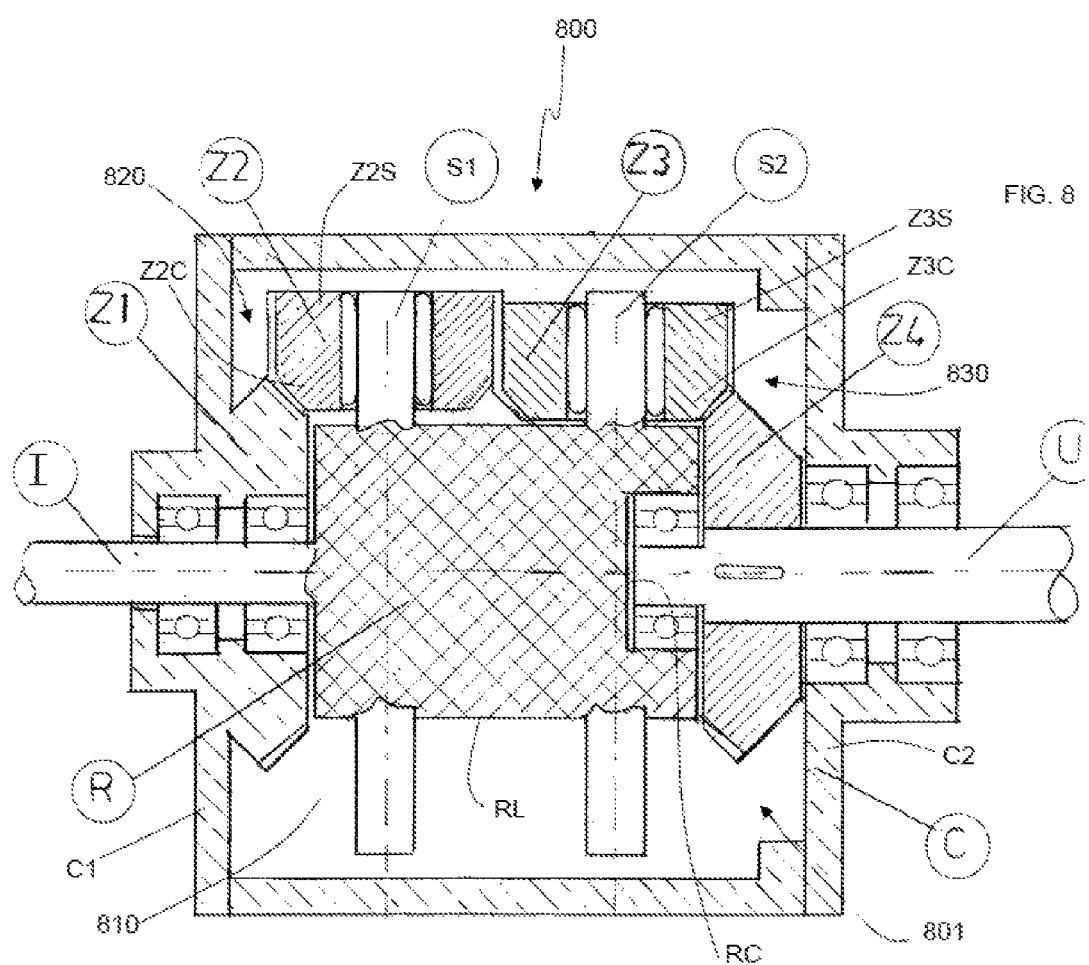

In FIG. 8, an eighth embodiment of the invention is illustrated, in which a reducer device 800 is described which has different structure from that of the reducer devices already described in the preceding embodiments of the invention, even if the main structural characteristics and the general functioning remain unchanged.

In the reducer device 800, the reduction members 801 which interconnect the input shaft I with the output shaft U provide for an input movable drive group 810 which comprises a rotor R with cylindrical conformation, fit at the end to the input shaft I. The rotor R provides for, at the opposite end, a cavity RC adapted to rotatably support the proximal end of the output shaft U, in cooperation with the output wall C2 of the case C.

A pair of first S1 and second S2 secondary shafts is fixed to the lateral surface RL of the rotor R; such shafts are parallel to each other, and are extended from the same rotor R perpendicular to the axis of the input shaft I.

The secondary shafts S1,S2 respectively support, idly on the axes thereof, a pair of first Z2 and second Z3 secondary toothed wheels. The latter comprise a more external portion with cylindrical toothing Z2S,Z3S and a more internal portion with conical toothing Z2C,Z3C, with respect to the aforesaid rotor R.

The external portions with cylindrical toothing Z2S,Z3S of the secondary toothed wheels Z2,Z3 engage with each other, and preferably possess the same number of teeth.

The fixed reference group 820 provides for a reference toothed wheel Z1 also with conical toothing, fixed to the internal face of the input wall C1 of the case C coaxial with respect to the input I and output U shafts, or also, as illustrated, in a single body therewith. The reference toothed wheel Z1, in particular, engages with the internal portion with conical toothing Z2C of the first secondary toothed wheel Z2.

The output movable drive group 830 provides for an output toothed wheel Z4 with conical toothing, mounted at the end of the output shaft U between the aforesaid output wall C2 of the case C and the rotor R, and engaging with the internal portion with conical toothing Z3C of the second secondary toothed wheel Z3.

For the purpose of increasing the torque transferred by the reducer device 800, multiple pairs of secondary shafts S1,S2 and of corresponding secondary toothed wheels Z2,Z3 can be provided. In FIG. 6, a possible arrangement of the second pair of the aforesaid secondary shafts S1,S2 is outlined, opposite with respect to the first pair.

The functioning principle of the reducer device 800 is very similar to that already described for the preceding embodiments of the same. In this case, the first Z2 and second Z3 secondary toothed wheels are not integral with each other, but constrained by a toothed coupling, with the same number of teeth. A complete rotation of the first secondary wheel Z2 is followed by a complete rotation of the second toothed wheel Z3, with opposite rotation direction.

The particular conformation of the reducer device described above has the characteristic of non-reversibility, i.e. that it is not possible to transfer a rotation of the output shaft U to the input shaft I. Indeed, from the standpoint of the output shaft U, the meshing chain Z4-Z3S-Z2S-Z1 concludes in the aforesaid fixed reference toothed wheel Z1. The output shaft thus results blocked with respect to both rotation directions.

It should be observed that, pursuant to the aforesaid combination of couplings between the toothed wheels Z1,Z2,Z3,Z4, it is possible to obtain a high number of configuration variants of a reducer device according to the invention, along with a high number of possible values for the reduction ratio.

Figure 9:
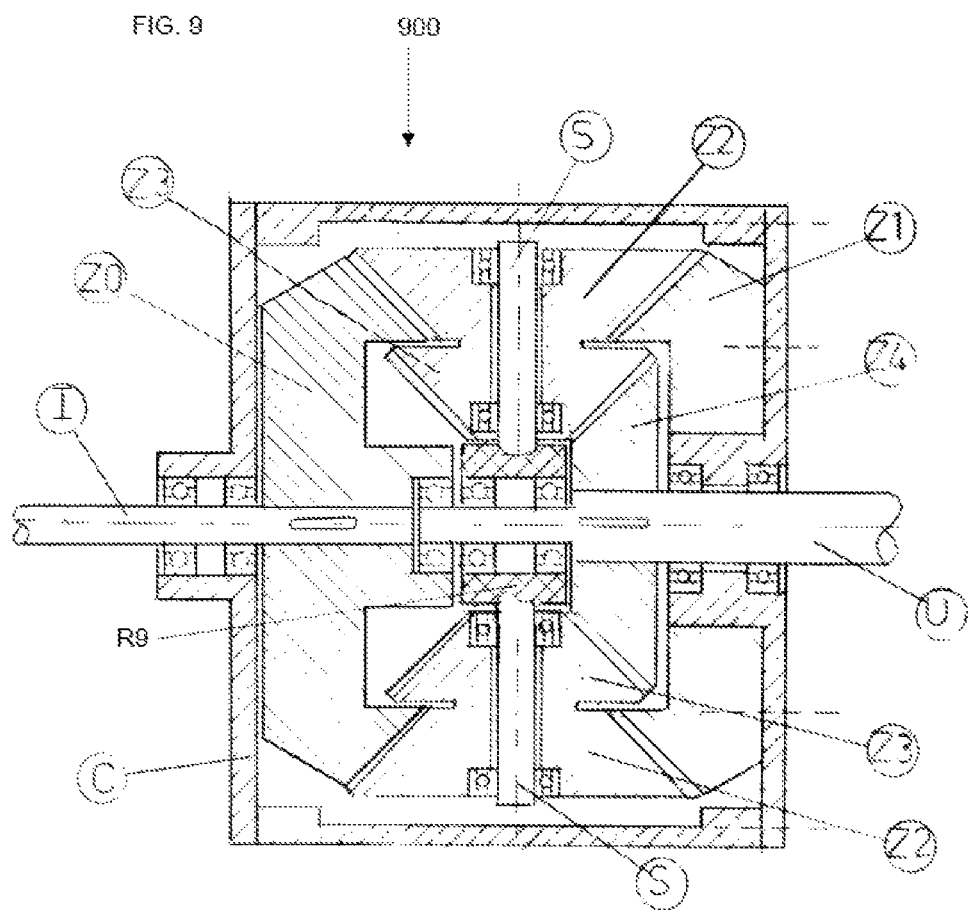

With particular reference to FIG. 9, the ninth embodiment is observed; in particular, this is a variant of the reducer of FIG. 1. The ninth variant is indicated with reference number 900 in its entirety.

Z0 indicates the input toothed wheel, Z1 the reference toothed wheel; Z2 and Z3 indicate the secondary toothed wheels, while Z4 indicates the output toothed wheel.

The reducer of FIG. 9 differs from the base reducer (FIG. 1) due to the fact that the rotor R9 is not placed in rotation directly by the input shaft I (as instead occurs in the reducer of FIG. 1) but rather by the toothed wheel Z0 integral with the input shaft; said toothed wheel Z0 is engaged with the toothed wheel Z2 which in turn rotates the rotor R9 on which it is installed.

The main advantage offered by the mechanical speed reducer device according to the invention is constituted by the possibility to obtain high reduction ratios, maintaining a bulk, and consequently a weight, of the reducer that is particularly limited.

A further advantage is given by the fact that a mechanical reducer with high reduction ratio is obtained with a simple and reliable structure, and with reduced production costs.

Another advantage of the invention is to obtain a mechanical reducer with high reduction ratio in which such ratio is easily modifiable, without however compromising the structure, the simplicity and the reliability of the reducer itself.

The invention claimed is:

1. A mechanical reducer device with a reduction ratio, the mechanical reducer comprising:
   a box-like case provided on an input wall thereof with an input opening and on an output wall thereof with an output opening;
   a rotatably-supported input shaft entering said case through said input opening, the input shaft being configured to be brought into rotation at an input angular speed;
   a rotatably-supported output shaft exiting outward from said case through said output opening, the output shaft being mechanically connected to the input shaft and being configured to provide an output angular speed that is reduced with respect to said input speed; and
   a plurality of reduction members mechanically connecting the output shaft to the input shaft, the reduction members comprising, arranged inside said case,
   an input movable drive group mechanically connected to said input shaft, the input movable drive group being conducted in rotation by the input shaft and comprising
      a first secondary toothed wheel, and
      a second secondary toothed wheel constrained to the first secondary toothed wheel,
   a reference fixed drive group comprising a reference toothed wheel which engages said first secondary toothed wheel, and
   an output movable drive group mechanically connected to said output shaft and comprising an output toothed wheel which engages the second secondary wheel,
   wherein the reference toothed wheel and the output toothed wheel have a number of teeth differing from each other by at least one tooth,
   the first secondary toothed wheel and the second secondary toothed wheel have a number of teeth differing from each other by one tooth, and
   wherein the input movable drive group comprises
      a rotor having cylindrical conformation and fit at the end of said input shaft, and
      at least one pair of first and second secondary shafts, mounted fixed on said rotor, parallel to each other and being extended from the rotor perpendicular to an axis of said input shaft, said first and second secondary toothed wheels being respectively rotatably supported by said first and second secondary shafts and both comprising an external portion with cylindrical toothing and an internal portion with conical toothing, said external portions with cylindrical toothing engaging each other,
   said reference toothed wheel has conical toothing, is fixed to the case coaxial with respect to the output shaft and input shaft, and engages with the internal portion with conical toothing of said first secondary toothed wheel, and
   said output toothed wheel has conical toothing, is mounted at the end of said output shaft and internally with respect to said reference toothed wheel, and engages with the internal portion with conical toothing of said second secondary toothed wheel.

2. A mechanical reducer device with a reduction ratio, the mechanical reducer comprising:
   a box-like case provided on an input wall thereof with an input opening and on an output wall thereof with an output opening;
   a rotatably-supported input shaft entering said case through said input opening, the input shaft being configured to be brought into rotation at an input angular speed;
   a rotatably-supported output shaft exiting outward from said case through said output opening, the output shaft being mechanically connected to the input shaft and being configured to provide an output angular speed that is reduced with respect to said input speed; and
   a plurality of reduction members mechanically connecting the output shaft to the input shaft, the reduction members comprising, arranged inside said case,
   an input movable drive group mechanically connected to said input shaft, the input movable drive group being conducted in rotation by the input shaft and comprising
      a first secondary toothed wheel, and
      a second secondary toothed wheel constrained to the first secondary toothed wheel,
   a reference fixed drive group comprising a reference toothed wheel which engages said first secondary toothed wheel, and
   an output movable drive group mechanically connected to said output shaft and comprising an output toothed wheel which engages the second secondary wheel,
   wherein the reference toothed wheel and the output toothed wheel have a number of teeth differing from each other by at least one tooth,
   the first secondary toothed wheel and the second secondary toothed wheel have a number of teeth differing from each other by one tooth, and
   wherein the input movable drive group further comprises
      a rotor fit with the output shaft, and
      at least one secondary shaft mounted fixed on the rotor and being extended therefrom perpendicular to the axis of the input shaft,
   the first secondary toothed wheel and the second secondary toothed wheel being integral with each other and having conical toothing and being supported on respective axes by the secondary shaft, respectively in a more internal position and a more external position with respect to the rotor,
   the reference toothed wheel having conical toothing and being fixed to the case which is coaxial with respect to the output shaft and the input shaft,
   the output toothed wheel having conical toothing and being mounted at the end of the output shaft and internally with respect to the reference toothed wheel, and
   the rotor is placed in rotation by an input shaft-integrated toothed wheel that is integral with the input shaft, said input shaft-integrated toothed wheel being engaged with the first secondary toothed wheel which rotates the rotor on which the first second toothed wheel is installed.

* * * * *